US012332135B2

(12) United States Patent
Endres et al.

(10) Patent No.: US 12,332,135 B2
(45) Date of Patent: Jun. 17, 2025

(54) SPRING OSCILLATION BASED INERTIA MEASUREMENT DEVICE

(71) Applicants: William J. Endres, Houghton, MI (US); Christopher M. Endres, Houghton, MI (US)

(72) Inventors: William J. Endres, Houghton, MI (US); Christopher M. Endres, Houghton, MI (US)

(73) Assignee: WECE Innovations, LLC, Houghton, MI (US)

( * ) Notice: Subject to any disclaimer, the term of this patent is extended or adjusted under 35 U.S.C. 154(b) by 477 days.

(21) Appl. No.: 17/809,165

(22) Filed: Jun. 27, 2022

(65) Prior Publication Data

US 2022/0412833 A1 Dec. 29, 2022

Related U.S. Application Data

(60) Provisional application No. 63/215,945, filed on Jun. 28, 2021.

(51) Int. Cl.
*G01M 1/10* (2006.01)
*G01D 5/56* (2006.01)
*G01H 1/00* (2006.01)

(52) U.S. Cl.
CPC .............. *G01M 1/10* (2013.01); *G01D 5/56* (2013.01); *G01H 1/003* (2013.01)

(58) Field of Classification Search
CPC ............ G01H 1/003; G01M 1/10; G01D 5/56
USPC ........................................................ 73/65.07
See application file for complete search history.

(56) References Cited

U.S. PATENT DOCUMENTS

| 3,693,413 | A | * | 9/1972 | Boynton | G01M 1/10 73/65.08 |
| 4,429,574 | A | * | 2/1984 | Barry | G01G 3/165 73/580 |
| 5,442,960 | A | * | 8/1995 | Solberg, Jr. | G01G 3/16 73/580 |
| 5,902,964 | A | * | 5/1999 | Solberg, Jr. | G01G 3/16 177/1 |

FOREIGN PATENT DOCUMENTS

| DE | 102015216942 A1 | * | 3/2017 | |
| GB | 2061532 A | * | 5/1981 | G01M 1/10 |

OTHER PUBLICATIONS

Commercial product information sheet/brochure, torsion-bar based (not helical spring based) MOI measurement device by Inertia Dynamics, information available at https://www.altraliterature.com/-/media/Files/Literature/Brand/inertia-dynamics/catalogs/p-7874-idi-sections/p-7874-idi_moment-of-inertia.ashx.

* cited by examiner

*Primary Examiner* — Peter J Macchiarolo
*Assistant Examiner* — Monica S Young

(57) ABSTRACT

This invention relates to devices used to measure the mass moment of inertia (MOI) of physical objects. It is a compact device that is easy to use and adjustable to broaden the range of physical object sizes/MOIs that would not otherwise be measurable with a single nonadjustable device. The device protects certain components from being lost, disturbed or damaged by the user by attaching those components to the device, while still allowing the adjustability noted. Some parts, such as one or more auxiliary platters, must be fully attached and detached for the purpose of adjustment.

19 Claims, 8 Drawing Sheets

SPRING OSCILLATION BASED INERTIA MEASUREMENT DEVICE

CROSS-REFERENCE TO RELATED APPLICATION

This application is based upon and claims priority to and the benefit of U.S. provisional application Ser. No. 63/215,945 filed Jun. 28, 2021, the disclosures of which are hereby incorporated in their entirety by reference herein.

BACKGROUND OF THE INVENTION

The invention addresses the measurement of mass moment of inertia of a physical object that is, generally, a rigid body or behaves relatively speaking as such. Mass moment of inertia is also referred to as moment of inertia, angular mass, or rotational inertia; moving forward here it will be simply referred to as MOI. A numeric quantity for an object's MOI is needed in order to mathematically model the rotational dynamics of either the object or a system in which the object is incorporated. Examples span many industry and application domains, from military to commercial and including ground vehicles, air vehicles, space vehicles, their subsystems, and many non-vehicular systems and subsystems as well.

When measuring an object's MOI, it is measured about an axis. Oftentimes, the axis about which the MOI is desired is an axis through the object's center of mass or center of gravity (CG). But, the axis about which the MOI is measured, or about which the MOI may be desired, can be any axis, including an axis that does not even intersect with the object. The axis of interest, generally, would correspond to the axis about which the object will rotate in the system in which the object is incorporated.

The MOI of a specific physical object can be measured in a variety of ways. Those ways that are relevant to background here involve measuring the period of rotational oscillation of the rotor portion of an inertia measurement device. By adjoining the object to the rotor in a way that does not permit motion of the object relative to the rotor, the period of rotational oscillation changes as compared to the device without the object adjoined to it. A mathematical expression is used to calculate the MOI of the object, $I_o$, as a function of the period obtained with the object adjoined to the rotor, $T_o$, and the known MOI associated with the rotor/device alone, $I_d$, and the period obtained without an object adjoined to the rotor, $T_d$. The mathematical expression is derived from the mathematical model of the rotary dynamics of the measurement device/rotor.

The approach involves some sort of restoring force that causes the rotor of the measurement device, once rotationally displaced from equilibrium by an angle AO, to move back toward the equilibrium. By keeping damping sufficiently below critical damping, the rotational motion will be oscillatory about the equilibrium, allowing the period to be measured. By keeping damping low, the energy dissipation per oscillatory cycle is low and there will be many oscillations before the oscillatory motion becomes so small it is not practically discernable. By having multiple oscillations, and, thus, multiple observations of the period, an average period may be calculated, providing to the user an estimate of the object's MOI based on the aforementioned mathematical expression.

The restoring force is commonly gravitational acceleration/pull or a spring force, the spring being of various sorts, including but not limited to a torsion bar, a torsion spring, or a helical spring acting substantially tangentially to the rotor. Basically, any means of storing potential energy in the system by means of rotationally displacing the rotor allows that potential energy to be converted to kinetic energy, back to potential energy, and so forth—the oscillatory motion noted above. Deflection of a structure, i.e., a spring, or change in height in the presence of gravity—a pendulum is an example of this—are common ways of doing this. A gravitationally-based method of measuring MOI is called a trifilar pendulum, or simply a trifilar; it does not look like a conventional pendulum, but works on the same principle of angularly displacing the rotor. Unlike a conventional pendulum where the angular displacement is about an axis generally normal to the gravitational vector, the angular displacement for a trifilar is about the gravitational vector itself causing a small vertical displacement, opposite gravity, so that gravity provides the restoring force.

The present invention uses springs to provide the restoring force. For an undamped situation, the relation between period, T, and MOI, I, in such a system/device is $T=2\pi(I/k)^{1/2}$, where k is the effective/net torsional spring stiffness in units of torque per angle in radians. Units on T are sec/cycle, where a cycle is the cycle of oscillatory motion and equals the time elapsed from a positive/negative peak to the subsequent positive/negative peak; a cycle may alternatively constitute every other passing through the zero-angle point, which means the time elapsed between each passage through the zero-angle point could provide an observation of the half-period, T/2. The noted relation applies for the device alone—$T_d=2\pi(I_d/k_d)^{1/2}$—and when an object is adjoined to the rotor—$T_o=2\pi\{(I_d+I_o)/k_d\}^{1/2}$. With $T_d$ and $T_o$ measured, this allows the object's MOI about the axis of the rotor, $I_o$, to be computed as $I_o=\{(T_o/T_d)^2-1\}\times I_d$. Since $I_d$ is difficult to know and maintain over time given that it is a value associated with all rotating elements of the device that are in communication with the rotor, including rotor bearing elements, for instance, it is generally identified, via ratio of $T_d$ to $T_c$, as $I_d=\{(T_d/T_c)^2-1\}\times I_c$, where $T_c$ is the period measured with a calibration object adjoined to the rotor and Ic is the known MOI of the calibration object. By keeping the calibration object simple, such as a cylinder for which $I=mr^2/2$, where m is the cylinder's mass and r is the cylinder's radius (half-dimeter), Ic is an easy number to quantify based on simple, precise measurements of $m_c$ and $r_c$ using a weight scale and micrometer, respectively.

Looking at the mathematical expression relating $I_o$, $I_d$, $T_o$, and $T_d$—$T_o/T_d=(1+I_o/I_d)^{1/2}$, when $I_o/I_d$ becomes small, that is, close to 0, the expected (i.e., via measurement) value of $T_o/T_d$ approaches unity. As $T_o/T_d$ approaches unity the ratio becomes more mathematically sensitive to measurement error in either $T_o$ or $T_d$. So, for instance, given a minimum value of $I_o$ desired to be measured, one might want $I_d$ to be no more than 5 times that, meaning $(1+I_o/I_d)^{1/2} \geq (1+0.2)^{1/2}=1.095$, or that one would expect $T_o$ to be at minimum about 10% higher than $T_d$. This would suggest making $I_d$ small so that small values of $I_o$ can be measured while avoiding undesirably high sensitivity to measurement error in either $T_o$ or $T_d$.

Now, simply making $I_d$ small, say by minimizing the MOI of the rotor through choice of low-density materials and inertia-minimizing geometry, is not actually preferred. Noting that $T_d=2\pi(I_d/k_d)^{1/2}$, for a given stiffness $k_d$, $T_d$ will become small and its measurement, which is needed for calibration as noted, will become sensitive to sensor resolution. Or, rather, doing so will require more expensive sensor and signal processing to maintain sensor and, thus, period-measurement, resolution. However, in order to measure low levels of $I_o$, one can make $I_d$ low, and also make $k_d$ appropriately low so as to keep sensor resolution requirements at a desired level.

Now, recalling that $T_o=2\pi(i_d+I_o)/k_d^{1/2}$, the drawback is that having a low-MOI rotor and a low device spring stiffness would mean that objects with higher MOI would have a much higher $T_o$, which translates into much more time needed to complete an MOI measurement/estimate for heavier MOI objects. More importantly than time extension, oscillations may damp out to become prohibitively small to accurately observe the period before the number of desired oscillations, and, hence, the number of desired observations of $T_o$, can be made. For instance, if one wants, say, 20 oscillations in order to get 20 observations of $T_o$, as $T_o$ gets larger, and friction in the device remains unchanged or even gets worse due to more mass acting on the friction interfaces, this issue can arise. To counter this, one may increase spring stiffness $k_d$ in order to increase, for a given $\Delta\theta$, the potential energy stored in the spring before the test commences; this overcomes the damping issue while also keeping $T_o$ from getting excessively large. It is important to note that potential energy storage ($\frac{1}{2}k_d \times \Delta\theta^2$), while increasing proportionally with $k_d$, increases with the square of $\Delta\theta$. Thus, also using a spring that permits a larger $\Delta\theta$ can be quite helpful in balancing the many requirements in order to accommodate larger ranges of $I_o$ with a single device; many available devices use a torsion spring which, while helping to keep frictional damping low, permits only a fairly small $\Delta\theta$.

And now, simply increasing $k_d$ to accommodate objects with larger $I_o$ will mean smaller parts will be subject to the aforementioned issue with sensitivity to period-measurement error, and if $k_d$ is too large relative to $I_d$, then measurement of $T_d$ can be degraded without the higher cost of higher/finer sensing resolution. There are multiple variables in the device design that must be balanced and, preferably, adjustable in a prescribed way, to achieve both good mathematical sensitivity to period-measurement errors and sensor measurement resolution that is not prohibitively costly.

To summarize, the need is to balance $I_d$ and $k_d$ in a way that accommodates a range of $I_o$ and, if possible, permitting $I_d$ and $k_d$ to be adjusted to extend the overall range of $I_o$ that can be well measured with a single inertia measurement device. For example, the MOI of the object and the rotor should be similar (say, the rotor being 0.5-5 times that of the object to be measured), and $k_d$ must not be too large for a given $I_d$ such that sensing resolution is not cost/complexity prohibitive in order to observe $T_d$. What this means is that for a given range of object MOI desired to be measured, a particular pair of $I_d$ and $k_d$ would be desired. To measure objects across a larger range of MOI becomes problematic. Products tend to manage this by offering multiple devices, each accommodating a relatively small range of $I_o$. The present invention addresses this with the ability to attach different platters on the device/rotor, each bringing successively higher $I_d$, but also with the ability to connect additional springs for larger platters so as to achieve a high number of oscillations under the damping present and to keep $T_o$ from getting larger than desired while also keeping $T_d$ from being too small when $I_d$ (alternate platters) is smaller. Further helping to combat damping effects, the present invention uses helical sprigs that permit a relatively large initial displacement $\Delta\theta$, compared to a torsion bar, meaning more potential energy can be stored at the start of a test.

As a final note, of course, all periods measured are not the natural periods assumed in the mathematics above; they are the damped periods, as zero damping is not possible in reality. Whether the effect of damping is of practical significance in degrading the estimate of $I_o$ or not depends on the accuracy with which $I_o$ is to be estimated.

BRIEF SUMMARY OF THE INVENTION

The present invention provides a means to measure the rotational MOI of an object that allows maintaining good robustness to period-measurement error in computing the object's MOI based on the device's MOI while also not requiring prohibitively high sensing resolution in order to precisely measure the device period and also avoiding excessively long period associated with the object, or worse yet, a limited number of oscillations, and thus period observations, associated with the object due to damping effects. This is accomplished with a single inertia measurement device comprising a pair of primary helical springs permanently attached to the device, acting as a balanced pair, each of the pair communicating with the rotor in an opposing rotational manner by way of a cord that helically wraps around the rotor, the rotor being supported in the plane normal to its axis by one or more low-friction bearings and axially by one of the low-friction bearings, the rotor including a top surface on which an object may be placed/adjoined. Here, and moving forward, we use the word "permanently" or "substantially permanently" to mean that the attaching, adjoining, or affixing described as such is not readily reversed (detached, dis-adjoined, unaffixed), though reversal could be achieved generally with tools and with a level of effort by the user (i.e., not readily done so) not generally desired for ease of useability.

One embodiment further comprises a permanently affixed noncontact magnetic switch to sense the period while another embodiment further comprises a permanently affixed noncontact photoelectric switch to sense the period. Other embodiments further comprise a noncontact optical or magnetic encoder to sense the peaks of the angular oscillatory motion and a microcontroller algorithm, such as but not limited to logarithmic decrement, to adjust estimates of the object's MOI to substantially eliminate inaccuracy imposed by damping. Another embodiment further comprises a means for displaying the oscillation peaks in near-real time. Another embodiment further comprises a means of communicating to an external display device, such as but not limited to a series of wires, or a wireless means including but not limited to Bluetooth, WiFi, or radio frequency (RF).

An additional embodiment further comprises an anti-slip material on a portion of the top surface of the rotor. Another embodiment further comprises a pair of pulleys, each corresponding to one of the pair of primary helical springs, over each of which rides respective portions of the cord lying between the respective spring and the rotor, which allows a more compact footprint of the inertia measurement device. Another embodiment further comprises one or more attachable auxiliary platters and one or more auxiliary-spring sets where, for larger-MOI parts, a larger platter may be affixed to the top surface and one or more pairs of auxiliary-spring sets may be connected/disconnected to/from the cord, together or in combination, and when disconnected from the cord stowed on the device while remaining permanently attached to the device.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

DETAILED DESCRIPTION OF THE INVENTION

Figure 1:
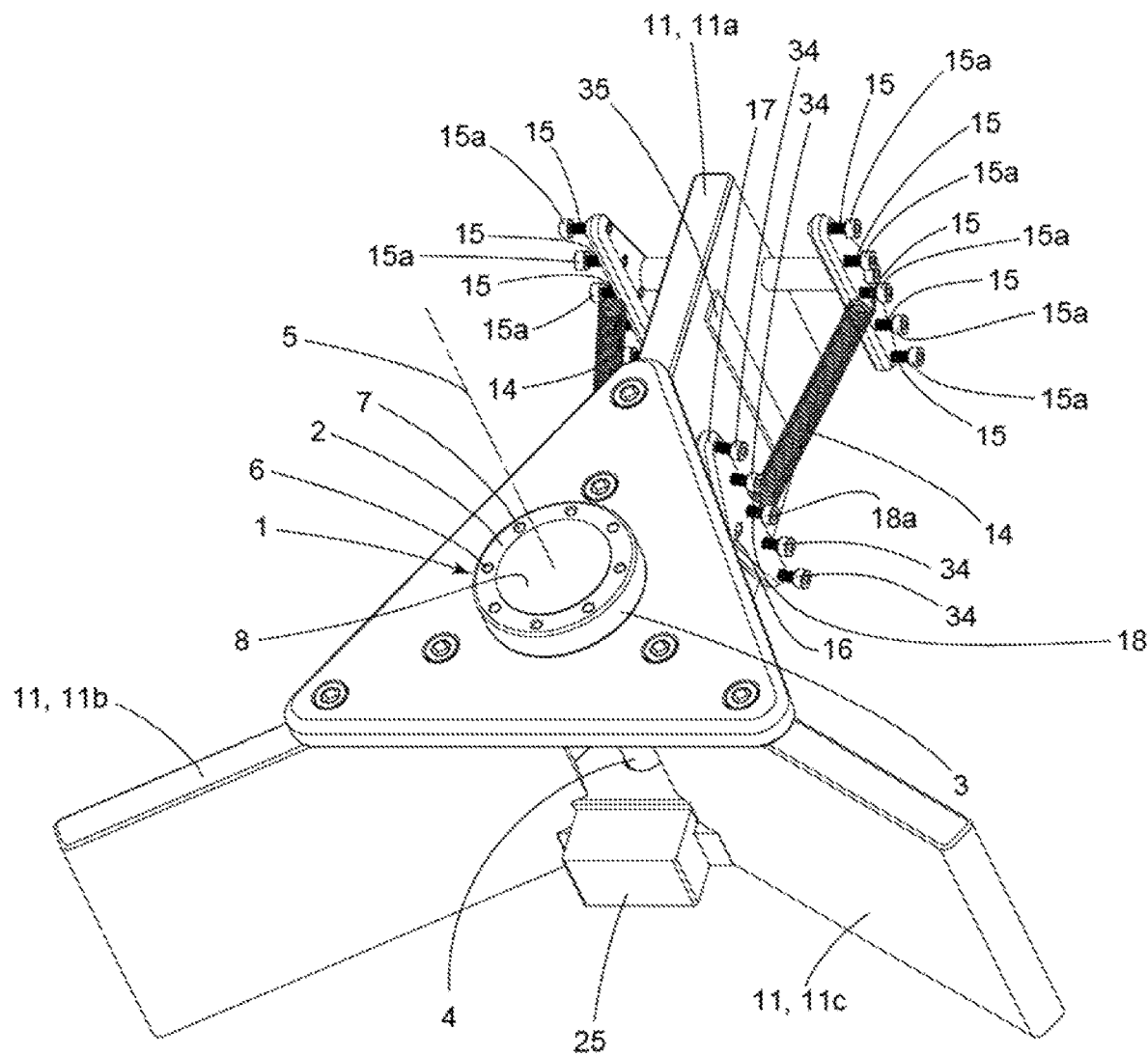
FIG. 1 is a top-front-right oblique view of one embodiment of an inertia measurement device.
Figure 2:
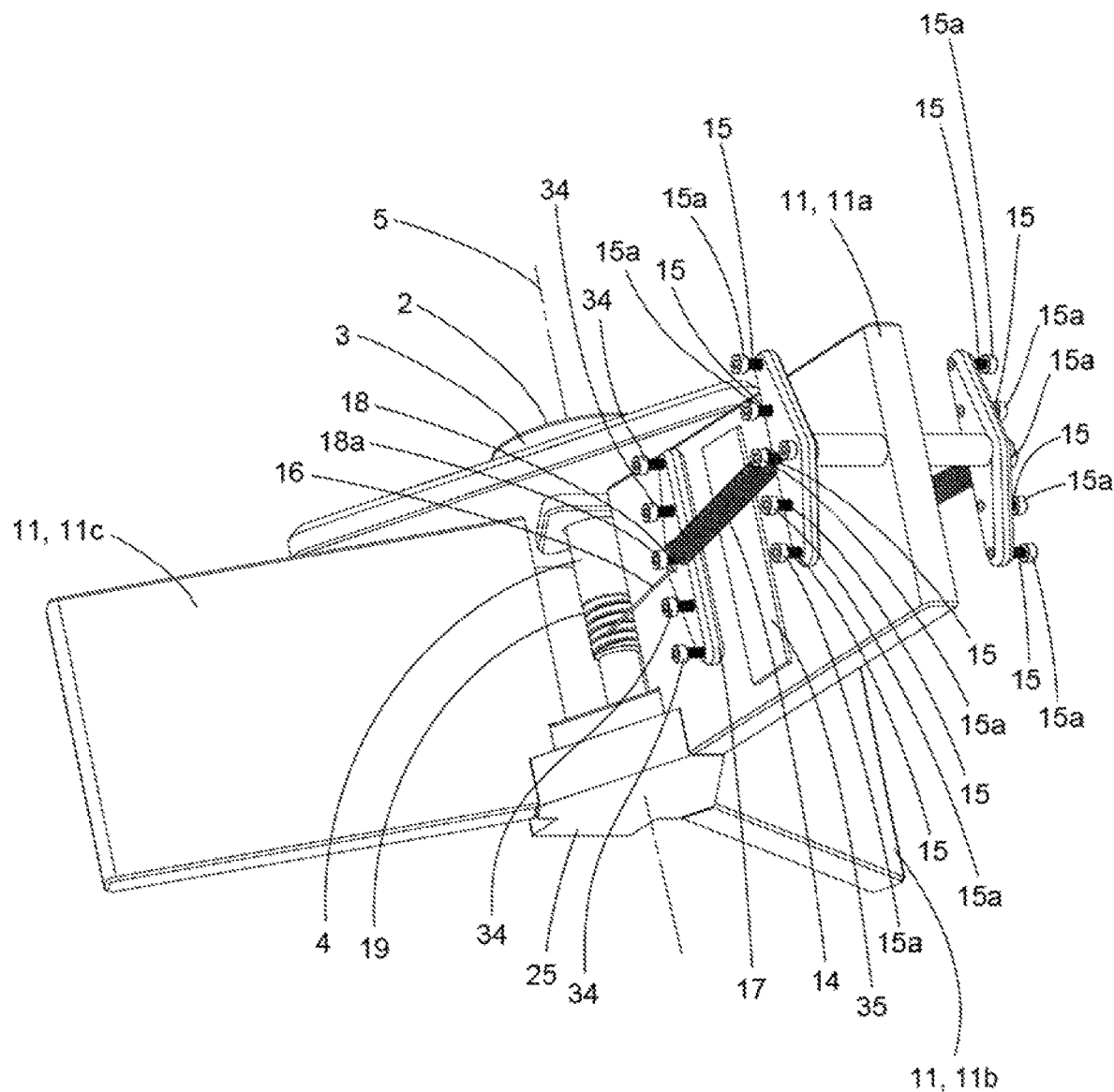
FIG. 2 is a right-back-bottom oblique view of one embodiment of an inertia measurement device.
Figure 3:
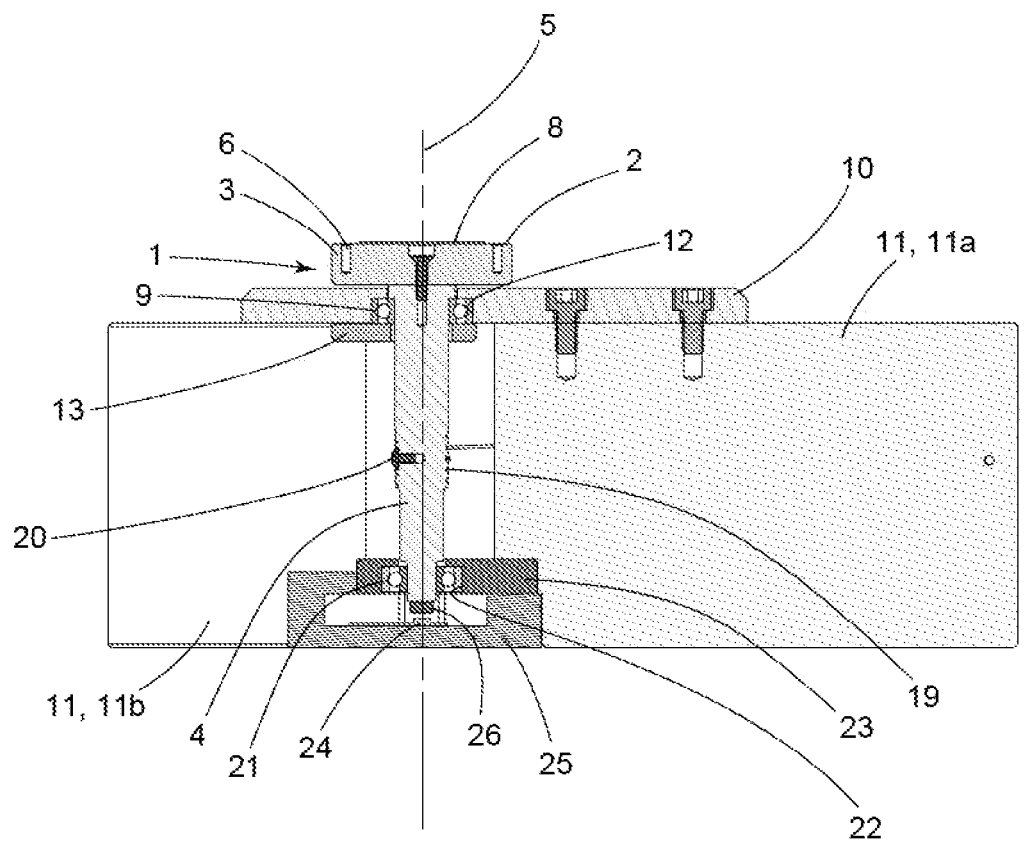
FIG. 3 is a right, midplane-section view of one embodiment of an inertia measurement device.

The present invention, shown in FIGS. 1 and 2, is an inertia measurement device by which the MOI of an object may be determined by placing it on rotor 1, more specifically on top surface 2 of primary platter 3 of rotor 1. Primary platter 3 is larger in diameter than shaft 4, which is also part of rotor 1. Rotor 1 is free to rotate about axis 5. Top surface 2 typically has threaded holes 6 and optionally non-treaded dowel holes 7, the threaded holes being one means of attaching an auxiliary platter 31 (see FIGS. 4 and 5). Top surface 2 may also have a portion covered with a non-slip material 8 such as but not limited to Dycem®, neoprene, or urethane, upon which the object may be placed to avoid it sliding relative to top surface 2 during a test. Turning to the section view of FIG. 3 shows that rotor 1 is supported by bearing 9 which is mounted in top plate 10. Bearing 9 is shown here as a rolling element bearing, more specifically a ball bearing. Since both axial load—the weight of both rotor 1 and the object being measured—which acts along or parallel to axis 5, must be supported, bearing 9 must be of a type that can support axial load in addition to providing radial location in the plane normal to axis 5. Deep groove ball bearings are a good option, in particular any type that is of very low friction such as but not limited to bearings with ceramic rolling elements and using a very light oil rather than grease, the oil serving the purpose of minimizing oxidation on the bearing surfaces.

Top plate 10 is attached to legs 11, which include rear leg 11a and front legs 11b and 11c. Since three points define a plane, such as the surface upon which the inertia measurement device will be placed, using three legs is a natural choice and, in this embodiment, the three legs 11 make up the base of the inertia measurement device. Bearing 9 must be supported from below, so in the case where bearing seat 12 is formed in top plate 10 from below (as shown in FIG. 3, the purpose for doing so may be for improved manufacturability), a bearing cover 13 is needed; fasteners, including screws and dowel pins, are omitted in FIG. 3 in various places, for simplicity.

Rotor 1 is exposed to a restoring force from a pair of primary helical springs 14 that are attached to the base, more specifically rear leg 11a, by way of spring-base attachments 15. The other end of each primary helical spring 14 is attached to cord 16 by way of a respective spring block 17. Each spring block has a primary-spring catch 18. Cord 16 wraps around cord guide 19 on shaft 4. Visible in FIG. 3 is a spring-cord screw 20 that may be installed to assure the cord does not gradually walk around cord guide 19, though, the primary means of non-slip/no-walk is friction between cord 16 and cord guide 19 by way of the capstan effect, which can be enhanced through additional wraps or other cord attachment means such as but not limited to a pin or a hook. The design intent allows the primary helical springs 14 to be permanently connected to the inertia measurement device; as such, spring-base attachments 15 and primary-spring catch 18 would be tightened down and/or include a flat washer or other means to assure the loop on primary helical spring 14 does not fit over the spring-base attachment end 15a or primary-spring catch end 18a.

If objects to be measured are placed with their CG nearly coincident with axis 5, the moment on bearing 9 is small. Making bearing 9 larger in diameter can help withstand such a moment as well, but at the expense of greater torsional friction for the same quality and type of bearing. However, to improve mechanical durability, as shown in FIG. 3, bottom bearing 21 may be included. This also allows cord guide 19 to be positioned further below bearing 9 since bottom bearing 21 significantly assists in carrying the spring force, as opposed to the spring force being supported by bearing 9 in the form of a spring-induced moment. Keeping the springs lower relative to top plate 10 also provides space for multiple auxiliary-spring sets 33 (see FIGS. 4 and 5) that facilitate adjustability for objects of higher MOI. Bottom bearing 21 is mounted in bottom bearing seat 22 in bottom plate 23. Because axial loads are borne by bearing 9, bottom bearing 21 does not require a cap as was needed at the top (bearing cover 13).

Regardless of whether bottom bearing 21 is included, shaft 4 interacts in a noncontact manner with sensor 24 generally located in a sensor housing 25. The embodiment in FIG. 3 is representative of using a magnetic sensor, either a switch or an encoder, where a magnet 26 is affixed to shaft 4 adjacent to sensor 24. A photoelectric switch or encoder, being noncontact as well, is another example of sensor type. Sensor 24 is affixed to the base of the inertia measurement device in a way that is not readily accessible/adjustable by the user. This is important to protect sensor 24 and to make measurements consistent across multiple users and over the lifetime of the inertia measurement device.

Figure 4:
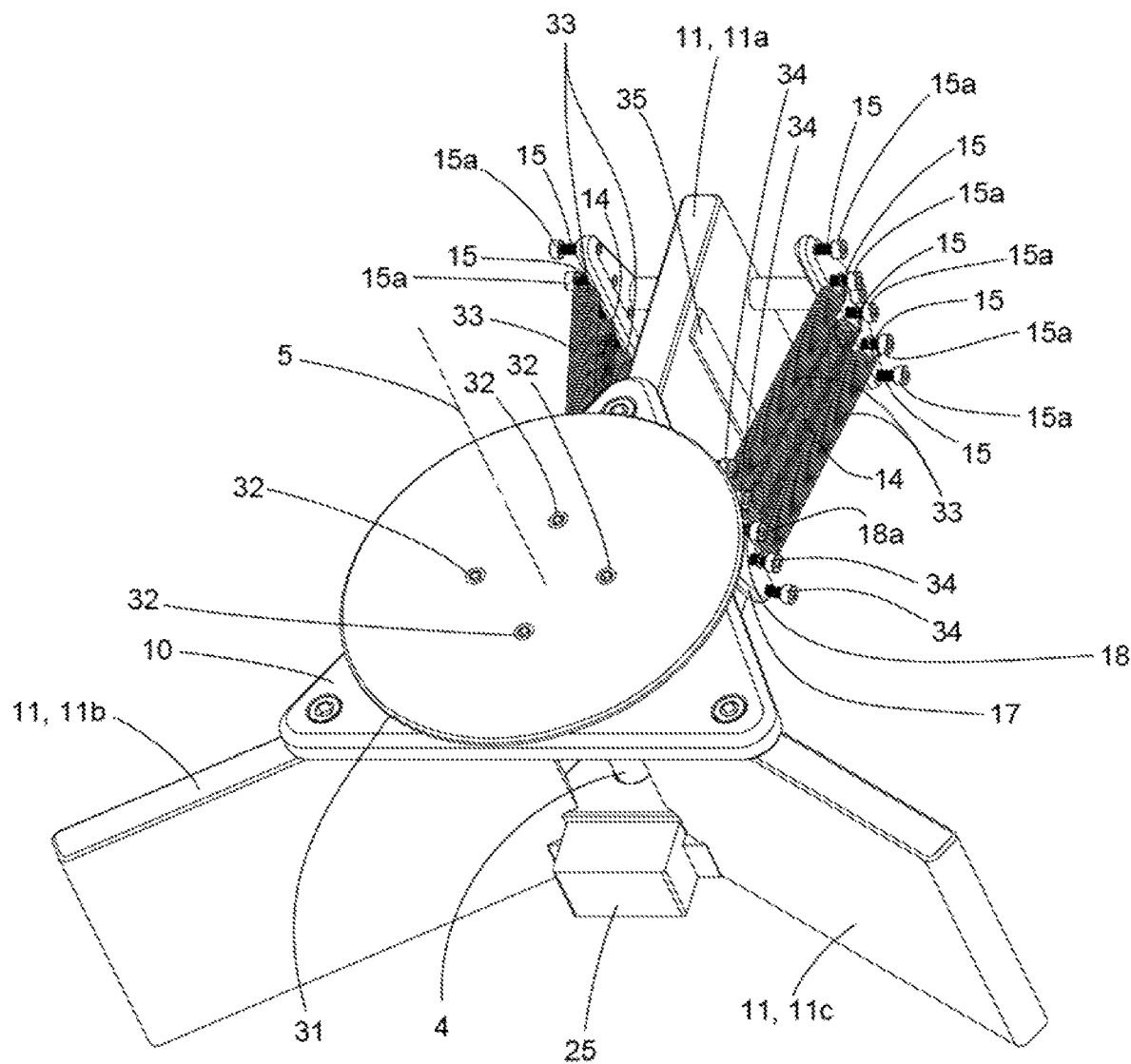
FIG. 4 is a top-front-right oblique view of one embodiment of an inertia measurement device corresponding to that in FIGS. 1 and 2 showing the addition of an auxiliary platter and auxiliary-spring sets.
Figure 5:
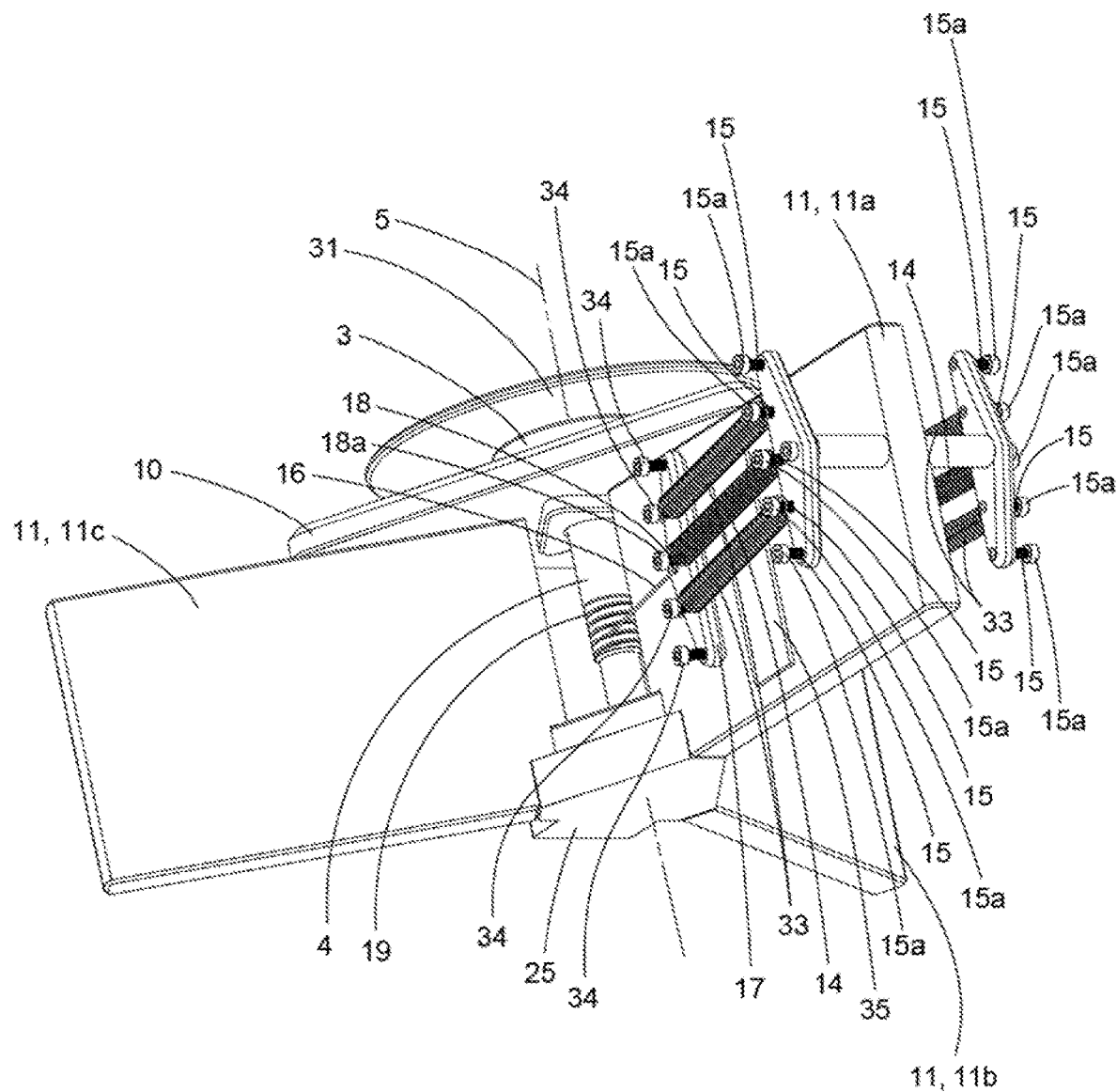
FIG. 5 is a right-back-bottom oblique view of one embodiment of an inertia measurement device corresponding to that in FIGS. 1 and 2 showing the addition of an auxiliary platter and auxiliary-spring sets.

Shown in FIGS. 4 and 5, auxiliary platter 31 is affixed to primary platter 3 by way of, but not limited to, fasteners 32 engaging threaded holes 6; alternatives could involve dowl pins, magnets, clips, and similar means of locating platter 31 on top surface 2 in the plane normal to axis 5 and, as needed for objects with their CG substantially misaligned with axis 5, attaching auxiliary platter 31 to primary platter 3. Auxiliary platter 31 may have a portion covered with a non-slip material and may also have markings in the form of concentric circles and/or radial lines to assist in adjusting the object to align its CG with axis 5 as a user may desire. Also shown in FIGS. 4 and 5 are a pair of auxiliary-spring sets 33, each comprising two auxiliary helical springs 33a that, when connected to spring block 17 by way of auxiliary-spring catches 34, straddle their respective primary helical spring 14 of the pair of primary helical springs 14. Each auxiliary-spring set 33 is also permanently attached to the base, more specifically rear leg 11a, by way of each auxiliary helical spring 33a being permanently attached to spring-base attachments 15. As with primary helical springs 14, the design intent allows the auxiliary-spring sets 33 to be permanently attached to the inertia measurement device; as such, spring-base attachments 15, but in this case not axillary-spring catches 34, would be tightened down and/or include a flat washer or other means to assure the loop on auxiliary helical spring 33a does not fit over the spring-base attachment end 15a. When auxiliary-spring sets 33 are not in use they are disconnected from axillary-spring catches 34 and stowed against leg 11a using stowage magnet 35 by way of magnetic attraction of each auxiliary helical spring 33a to stowage magnet 35.

Figure 6:
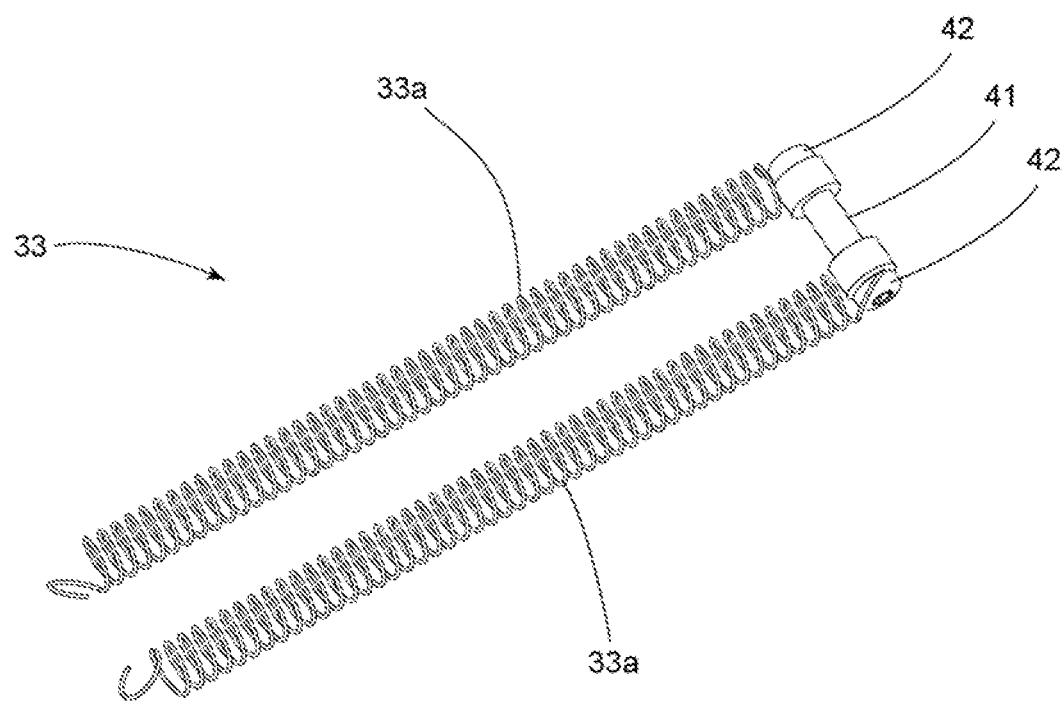
FIG. 6 is another embodiment of an auxiliary-spring set.
Figure 7:
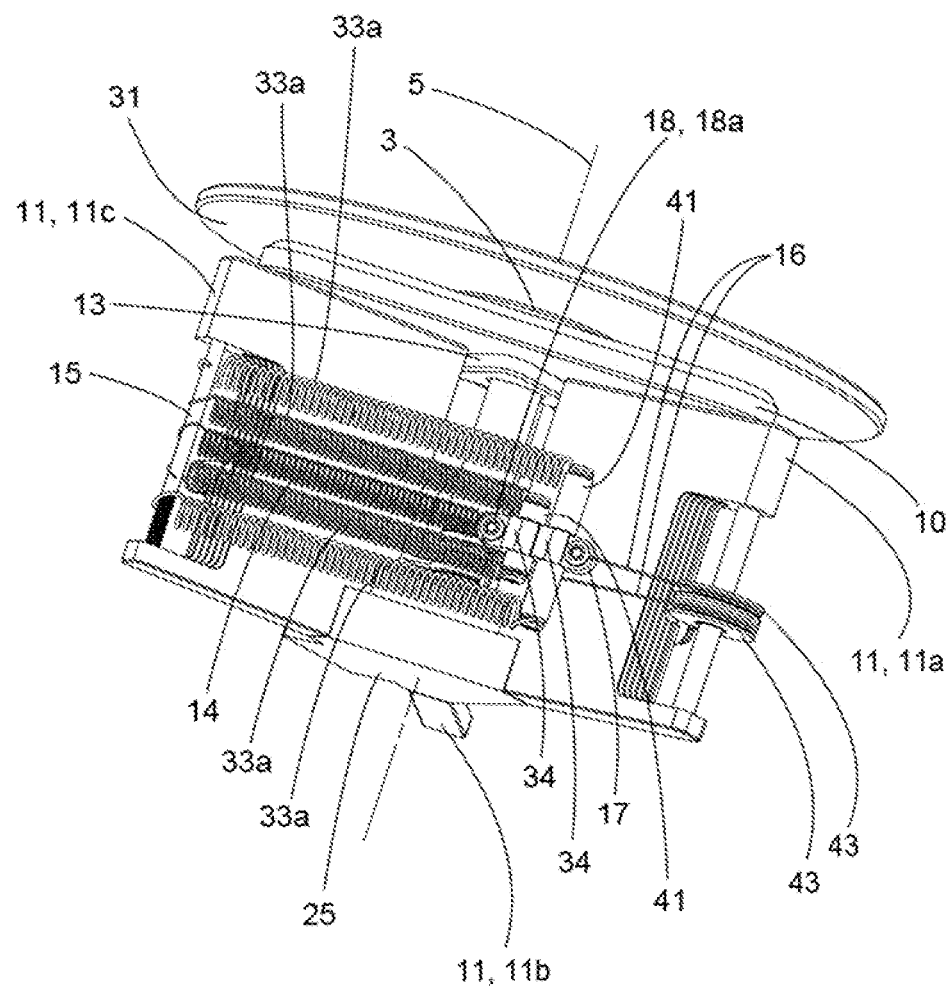
FIG. 7 is a right-bottom-back oblique view of another embodiment of an inertia measurement device employing auxiliary-spring sets depicted in FIG. 6.

Another embodiment employs a pair of pulleys 43 to allow a different means of permanently attaching and/or connecting, disconnecting and stowing springs while also permitting a smaller footprint of the inertia measurement device. FIG. 6 shows this alternate embodiment of an auxiliary-spring set 33, still comprising a pair of auxiliary helical springs 33a, but in this case the end that will communicate with spring block 17 does so by way of being attached to an auxiliary-spring spanner 41 by way of an auxiliary-spring fastener 42 or similar means of attachment. FIG. 7 shows a larger auxiliary platter 31 and how two auxiliary-spring sets 33, called out by their axillary helical springs 33a and their auxiliary-spring spanners 41, are connected to a leg 11, specifically 11c, by way of a single spring-base attachment 15. The same arrangement would exist on the other side, attached by way of a second base-spring attachment 15 to leg 11b; thus, in the embodiment shown in FIG. 7, there are two pairs of auxiliary-spring sets 33, the second of each pair (and respective spring-base attachment 15) being not visible, hidden in this view by leg 11a. FIG. 7 also shows cord 16 in communication between cord guide 19 (not visible) and the pair of spring blocks 17 by way of a respective pulley 43 intermediate cord guide 19 and respective spring block 17. On spring block 17 is one auxiliary-spring catch 34 for each auxiliary-spring set 33 on the respective side of the inertia measurement device; in this case shown there are two auxiliary-spring catches 34 per spring block 17, though there could be one or three or more. The auxiliary-spring spanner 41 of each auxiliary-spring set 33 engages a respective auxiliary-spring catch 34 in a way that it is readily connectable and disconnectable without the need for tools.

Figure 8:
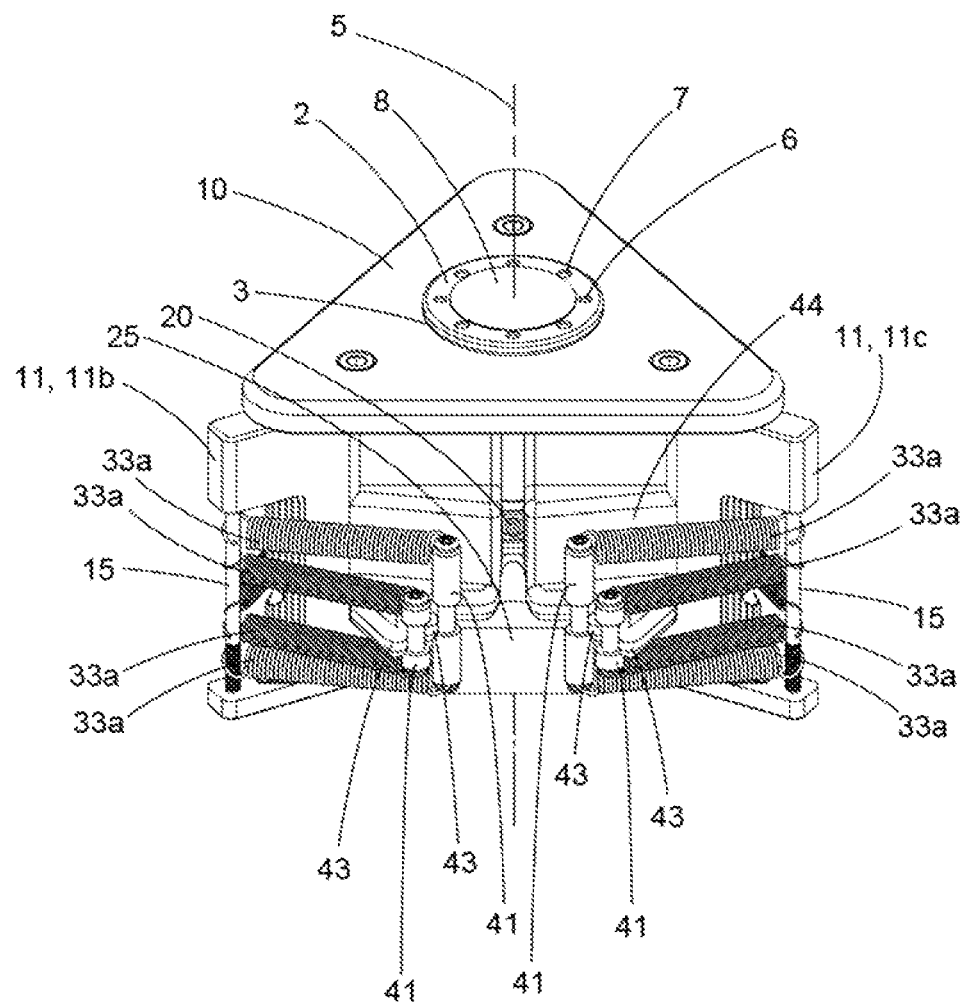
FIG. 8 is a top-front oblique view of the embodiment shown in FIG. 7 showing the means for stowing permanently attached auxiliary-spring sets when not in use.

FIG. 8 shows how auxiliary-spring sets 33 are stowed when not in use. Each auxiliary-spring spanner 41 of each auxiliary-spring set 33 engages a respective stowage hook 43 on front panel 44.

Generally, within sensor housing 25 would also be some or all of the electronic devices and circuitry, generally including a microcontroller and algorithms running on the microcontroller necessary for processing sensor information, including but not limited to peak finding, zero-crossing finding, and logarithmic decrement, ultimately communicating raw or processed information to a display that is either a part of the inertia measurement device or external to the inertia measurement device, or both. Communication to the display device may be by a cord or by way of a wireless means, such as but not limited to Bluetooth, WiFi, or radio frequency (RF).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An inertia measurement device that facilitates periodic angular oscillatory motion of an object comprising:
    a. a base having three or more legs;
    b. a rotor comprising a shaft, a primary platter, and a top surface that rotates about an axis;
    c. a bearing affixed to the base and intermediate the base and the shaft;
    d. a pair of primary helical springs each attached at one end to the base and at the other end to a cord, the cord communicating between each helical spring and the shaft and wrapping at least partially around a cord guide on the shaft, the cord guide being cylindrical about the axis and having a helical groove to facilitate more than 360 degrees of cord wrap without the cord overlapping itself;
    e. one or more pair of auxiliary-spring sets attached at one end to the base and connected at their other ends to a spring catch that allows connection to and disconnection from the cord, where each auxiliary-spring set of each pair of auxiliary-spring sets when connected to the cord works in parallel with the respective primary helical spring; and
    f. a noncontact sensor affixed to the base in a permanent way for observing angular motion of the rotor.

2. The device of claim 1 in which the base extends at least the extent of the shaft where the base further comprises a bottom bearing affixed to the base and intermediate the base and the shaft positioned opposite the cord guide from the bearing as measured along the axis.

3. The device of claim 2 in which the noncontact sensor is a magnetic encoder.

4. The device of claim 2 in which the noncontact sensor is a photoelectric encoder.

5. The device of claim 3 further comprising a microcontroller that communicates with the noncontact sensor thereby recording the angular motion of the rotor.

6. The device of claim 5 in which the microcontroller is configured to compute a damped period of angular oscillatory motion from the angular motion observed by the noncontact sensor.

7. The device of claim 6 in which the microcontroller is configured to compute a natural period by applying logarithmic decrement to the damped period of angular oscillatory motion.

8. The device of claim 7 in which the microcontroller communicates with the noncontact sensor by way of one or more wires.

9. The device of claim 7 in which the microcontroller communicates with the noncontact sensor wirelessly.

10. An inertia measurement device that facilitates periodic angular oscillatory motion of an object comprising:
    a. a base having three or more legs;
    b. a rotor comprising a shaft, a primary platter, and a top surface that rotates about an axis;
    c. a bearing affixed to the base and intermediate the base and the shaft;

d. a pair of primary helical springs each attached at one end to the base and at the other end to a cord, the cord communicating between each helical spring and the shaft traversing around one or more pulleys intermediate each helical spring and the shaft and wrapping at least partially around a cord guide on the shaft, the cord guide being cylindrical about the axis and having a helical groove to facilitate more than 360 degrees of cord wrap without the cord overlapping itself; and e. a noncontact sensor affixed to the base in a permanent way for observing angular motion of the rotor.

11. The device of claim 10, further comprising one or more pair of auxiliary-spring sets attached at one end to the base and connected at their other ends to a spring catch that allows connection to and disconnection from the cord, where each auxiliary-spring set of each pair of auxiliary-spring sets when connected to the cord works in parallel with the respective primary helical spring.

12. The device of claim 11 in which the base extends at least the extent of the shaft where the base further comprises a bottom bearing affixed to the base and intermediate the base and the shaft positioned opposite the cord guide from the bearing as measured along the axis.

13. The device of claim 12 in which the noncontact sensor is a magnetic encoder.

14. The device of claim 12 in which the noncontact sensor is a photoelectric encoder.

15. The device of claim 13 further comprising a microcontroller that communicates with the noncontact sensor thereby recording the angular motion of the rotor.

16. The device of claim 15 in which the microcontroller is configured to compute a damped period of angular oscillatory motion from the angular motion observed by the noncontact sensor.

17. The device of claim 16 in which the microcontroller is configured to compute a natural period by applying logarithmic decrement to the damped period of angular oscillatory motion.

18. The device of claim 17 in which the microcontroller communicates with the noncontact sensor by way of one or more wires.

19. The device of claim 17 in which the microcontroller communicates with the noncontact sensor wirelessly.

* * * * *